United States Patent

Bodin et al.

[11] Patent Number: 6,061,733
[45] Date of Patent: May 9, 2000

[54] METHOD AND APPARATUS FOR IMPROVING INTERNET DOWNLOAD INTEGRITY VIA CLIENT/SERVER DYNAMIC FILE SIZES

[75] Inventors: William Kress Bodin; Ted Ralph Mueller, both of Austin, Tex.

[73] Assignee: International Business Machines Corp., Armonk, N.Y.

[21] Appl. No.: 08/951,938

[22] Filed: Oct. 16, 1997

[51] Int. Cl.⁷ .................................................. G06F 15/177
[52] U.S. Cl. .......................... 709/233; 709/231; 709/203; 709/218
[58] Field of Search ...................... 395/200.33, 200.47, 395/200.48, 200.49; 709/203, 217, 218, 219, 231, 233, 236, 232

[56] References Cited

U.S. PATENT DOCUMENTS

| | | | |
|---|---|---|---|
| 5,162,986 | 11/1992 | Graber et al. | 700/17 |
| 5,495,610 | 2/1996 | Shing et al. | 709/221 |
| 5,572,643 | 11/1996 | Judson | 709/218 |
| 5,727,002 | 3/1998 | Miller et al. | 714/748 |
| 5,771,292 | 6/1998 | Zunquan | 713/176 |
| 5,913,215 | 6/1999 | Rubinstein et al. | 707/10 |

OTHER PUBLICATIONS

Chuck Forsberg; "DSZ Manual Addendum (Selected Pieces of the Pro–YAM Manual,"; Chap. 2.6.1 Receiver Window Size Override, Feb. 1997.

Chuck Forsberg, "The ZMODEM Inter Application File Transfer Protocol"; Chap. 11.2 ZRINIT, Oct. 1987.

M. Talla et al.; "QOS Based Performance of Selective Repeat Transport User in Hybrid ATM/TDMA Networks"; Proc., Sixth International Conf. on Computer Communications and Networks; pp. 313–318, Sep. 1997.

Park et al.; An Application of Real–Time IPC Controller Based ATM Cell; Proc., Second Intern'l Workshop on Real–Time Computing Sys. and Appl.; pp. 250–254, Oct. 1995.

*Primary Examiner*—Kenneth Coulter
*Attorney, Agent, or Firm*—David A. Mine, Jr.

[57] ABSTRACT

A method and apparatus for passing a large file from a server machine to a client machine as a collection of smaller files. Server code implements a user interface which allows a user on the client machine to input the name of the file to be downloaded. A pull-down menu allows the user to specify portion sizes for the file to be downloaded based on the capabilities and transfer rates of the client machine. Server code dynamically generates a page based on the user input showing the portion sizes which is displayed to the user at the client machine. Server code generates download links (Buttons) required to download the file including a download link (Button) to a platform specific shell script or batch file which is dynamically created for the download scenario. Server code uses the original source file to transmit smaller portions to the client machine. After all portions are downloaded, the portions are combined into a single file on the client machine using the shell script, batch file, or other executable.

12 Claims, 7 Drawing Sheets

METHOD AND APPARATUS FOR IMPROVING INTERNET DOWNLOAD INTEGRITY VIA CLIENT/SERVER DYNAMIC FILE SIZES

FIELD OF THE INVENTION

The present invention relates to data processing systems, and more particularly, to transferring large files in an Internet environment from a server computer to a computer workstation.

BACKGROUND OF THE INVENTION

As the Internet has evolved from a novelty into a business tool, customers are demanding faster and more reliable service. Users are not only sharing information over the Internet, often containing complex graphical content, but are also creating new usages. For example, the Internet has become increasingly popular as a mechanism for distributing software and other information. In order to increase the productivity of users in an Internet environment by reducing the time wasted waiting for information, a need exists to substantially speed up delivery of information. The software and other information sought to be transmitted over the Internet frequently exist in a single large file. The large sizes of the files containing the information increases the probabilities that large downloads will result in either a loss of connection, system time-out or other system problems. These problems often result in the loss of the software or information sought to be downloaded and frequently requires multiple retries before the task is accomplished, thereby reducing the productivity of users within the Internet environment.

One prior art solution attempted to alleviate the problems of transferring large files by increasing the speed of the hardware. This effort has been mainly concentrated on increasing the computer's modem speed. Since a 14,400 baud modem will download a file seven times faster then a 2400 baud modem, a file that takes one hour to download at 2400 baud would only take 8.6 minutes at 14,400 baud. Consequently, modem speeds have undergone seemingly endless increases from 2400 baud to 14.4K, 28.8K, 33.6K to today's highest-speed modems, which are capable of transmitting at or below a 56K baud rate. While the increases in modem speed eases the downloading of files in certain instances, what has resulted is a plethora of computers containing modems of differing transfer rates and capabilities.

Another prior solution attempted to alleviate the problems encountered when downloading a large file by splitting the large file into multiple smaller files. This results in a better chance of a given download being successful. For example, a large 10 megabyte (MB) file would be split into ten one-megabyte segments and stored along with the 10 megabyte file. A user would then select which file (e.g., 10 MB or 10 one-MB files) to download based on the transfer rates and capabilities of the user's computer. This solution suffers from the need for additional storage, labor expenditures for splitting the large file into smaller sections and writing of HTML (Hypertext Markup Language) for supporting downloading of the smaller sections. In addition, it is never possible to split a file into optimized segments for every potential user's computer wishing to download the file, since the ideal size of a split file is known only by the user downloading the split file.

Still other prior art techniques have sought to replace the analog lines over which information is typically transmitted with specialized transmission media such as ISDN (Integrated Services Digital Network) lines. A typical ISDN line has an un-compressed speed of 128K baud. However, ISDN lines are frequently more expensive than analog lines and are not available in every area.

Consequently, it would be desirable to provide a mechanism to pass a large file from a server to a client, as a collection of smaller files, without breaking the large file up on the server side while eliminating the need for creation of HTML or specific user interfaces for the split file.

SUMMARY OF THE INVENTION

This invention relates to a method and apparatus for passing a large file from a server machine to a client machine as a collection of smaller files. This is achieved without breaking up the large file on the server machine and linking the resultant portions to HTML specific to the downloadable portions. Server code is provided implementing a user interface. The user interface allows a user on the client machine to input the name of the file to be downloaded. A pull-down menu allows the user to specify portion sizes for the file to be downloaded based on the capabilities and transfer rates of the client's machine. Server code dynamically generates a page based on the user input showing the portion sizes which is then displayed to the user at the client machine. Server code next generates download links (Buttons) required to download the file including a download link (Button) to a platform specific shell script or batch file which is dynamically created for the download scenario. The specific shell script or batch file is downloaded to the client machine and the user is allowed to download portions of the large file. After all portions are downloaded, the portions are combined into a single file on the client machine using the shell script, batch file, or other executable.

DETAILED DESCRIPTION OF THE EMBODIMENTS

This invention provides a method and apparatus for downloading a large file while lowering the probabilities that the large file will result in either a loss of connection, time-outs, or other system problems. In addition, the invention avoids the need to break up the large file into smaller files and writing the supporting HTML to download these smaller "files". This invention provides this capability by providing a mechanism to pass a file from a server to a client, as a collection of smaller files.

Figure 1:
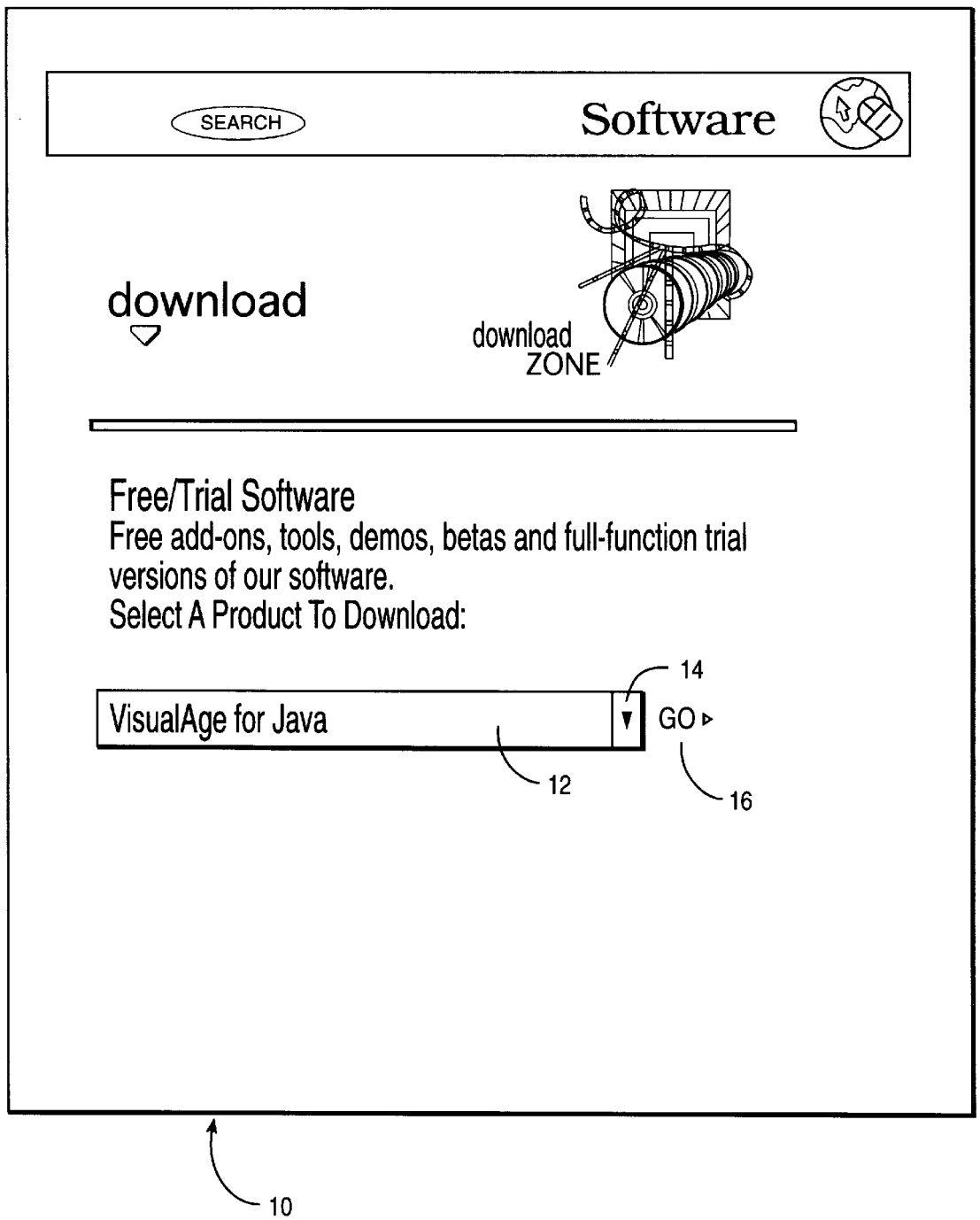
FIG. 1 is a display screen showing a dialog for selecting a file name to download using the invention.

Referring now to FIG. 1, there is shown a display screen 10 showing a dialog where a user selects a file name 12 for downloading. Additional file names may be accessed using the down indicator 14, which causes a pull-down dialog to be generated showing other file names. Once the desired file name 12 is selected, the user indicates completion of the file name selection process by selecting the "GO" button 16.

Figure 2:
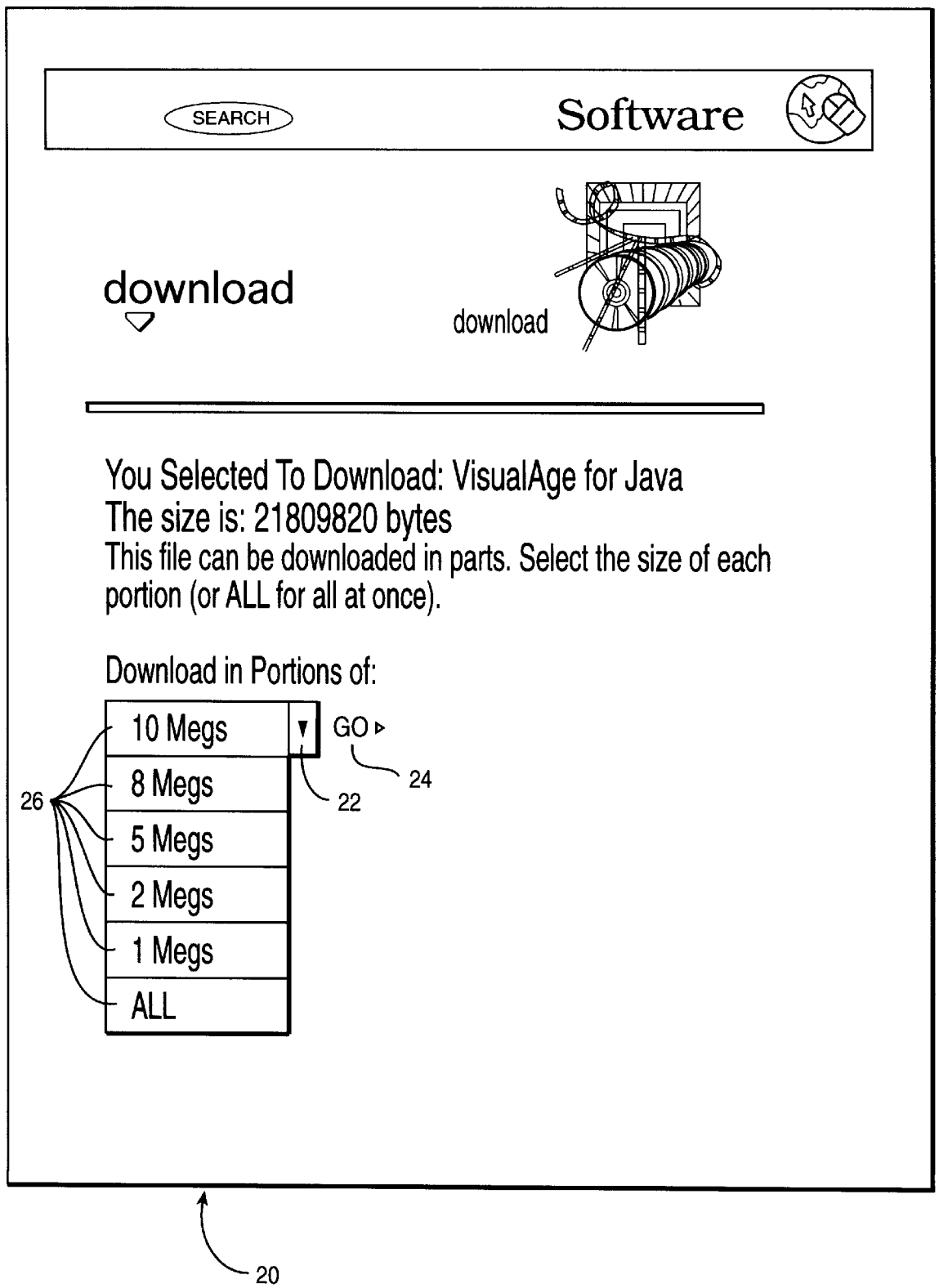
FIG. 2 is a display screen showing a dialog enabling the selection of portion sizes of a file to download using the invention.

Turning now to FIG. 2, there is shown a display screen 20 where a user selects the size of the portions 26 to download for the file name selected in FIG. 1. In the preferred embodiment, the portions sizes are fixed in value from 1 million bytes (Megs) to 10 million bytes for a file totaling 21,809,820 bytes. Users are permitted to access the available portion sizes 26 via the down indicator 22. An "ALL" option is also provided which allows a user to download the entire file. One skilled in the art will appreciate that while the preferred embodiment displays portions sizes having fixed values, a "CUSTOM" selection may be easily added which allows a user to define byte limits per portion of each file. The user indicates completion of the process to select the size of the portions to download by selecting the "GO" button 24.

Figure 3:
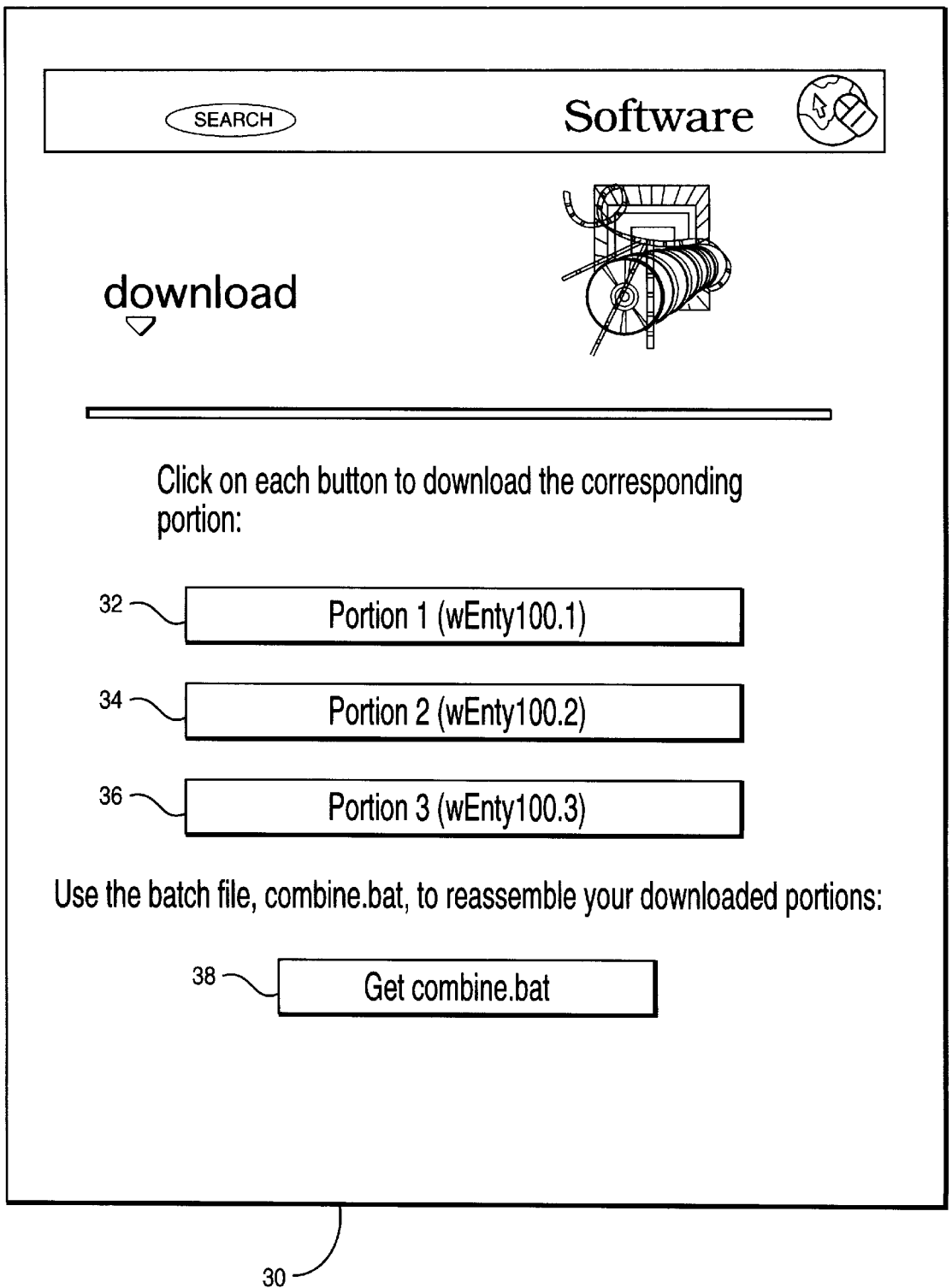
FIG. 3 is a dynamically generated screen showing portions of a file downloadable using the invention.

Referring now to FIG. 3, there is shown a dynamically generated screen 30 based on the user's input. These dynamically generated screens may be created using the PERL Scripting language or any compatible language. The dynamically generated screen 30 contains links to the following:

The name of the object to be downloaded;

A download link (Button) to a platform specific shell script or batch file which is dynamically generated for the specific download scenario. This script combines the "portions" together to form a complete resultant binary on a client machine.

Download links (Buttons) to the multiple portions of the file (1 . . . n).

Information about the portion size for each of the portion links (Buttons). The last portion of the file will frequently be less than the full portion size selected.

Turning again to FIG. 3, three portions 32, 34, 36 are displayed to the user of a client machine for downloading the file containing 21,809,820 bytes from the server machine. It will be appreciated that a 10 Megs portion size selection will result in two equal 10 millon byte portions and one portion containing the remainder of the file which amounts to 1,809,820 bytes for the 21,809,820 bytes file. Portion 1 (32) contains the name of a temporary file (e.g., "wEnty100.1") into which those respective portions will be downloaded on the client machine. Likewise, Portion 2 (34) and Portion 3 (36) contain a temporary file name into which those respective portions will be downloaded. The user causes the appropriate portion to be downloaded by selection of the Portion buttons 32, 34, 36. Selection of the Get combine.bat button 38 causes the client machine to select the link to the "combine" executable. This causes the server machine to download software responsible for assembling the portions into a single usable file on the client machine. One skilled in the art will appreciate that the procedure for assembling the portions into a single usable file may be implemented as an executable which becomes part of the first downloadable portion or is made available as a separate program executable. Selection of the Get combine.bat button 38 causes the execution of the combine.bat or the combine script file to assemble the downloaded portions into a single file on the client machine. One skilled in the art recognizes that the server side processing of this invention consists of code which is sensitive to arguments passed from the client machine. More specifically, server code is sensitive to the following arguments:

1) Portion Size
2) Portion Number

The client machine need only send the above arguments to the server machine containing a large downloadable file. The server machine is able to download any large file by performing a seek into the file where the resultant starting point is computed by taking the user selected portion number, subtracting 1, then multiplying by the portion size (e.g., PortionSize*(PortionNumber−1)). At this point, the server machine returns to the client machine the specific portion of the file in the desired PortionSize.

Figure 4:
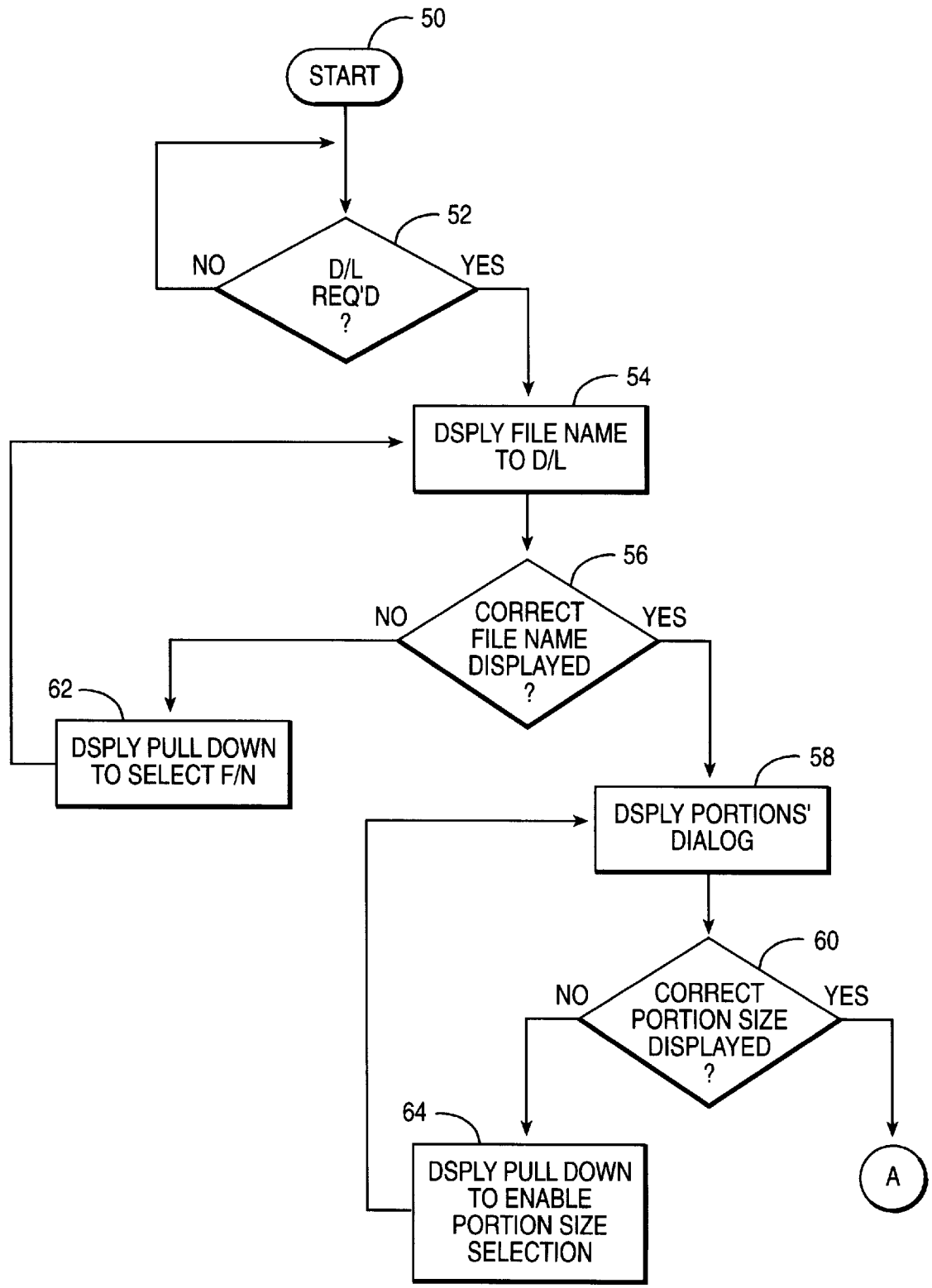
FIGS. 4 and 5 are flow diagrams for downloading portions of a file using the invention.
Figure 5:
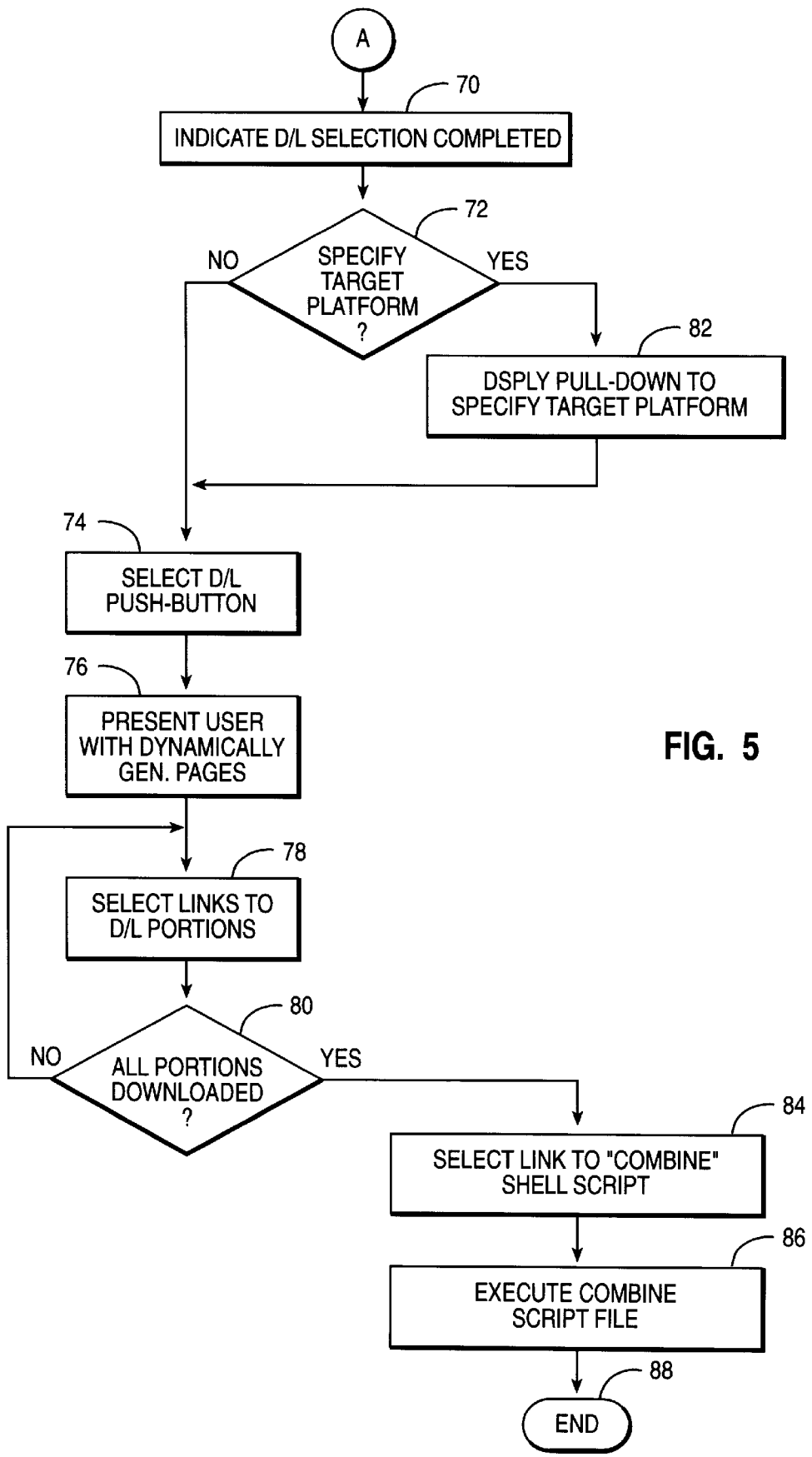

Referring now to FIG. 4, there is shown a flow diagram for operation of the invention. The procedure starts at block 50 and proceeds immediately to block 52 to determine if a download operation is required. If NO, the procedure continues to loop awaiting a download indication. If a download operation is required at block 52, the procedure displays a screen containing a dialog at block 54 to allow a user to enter the file name to download as illustrated in FIG. 1. Processing continues at block 56 where the procedure determines if the correct file name is displayed. If NO, at block 62 the procedure displays a pull-down to allow user selection of a desired file name. If YES, processing continues at block 58 where a portion size dialog is displayed. At block 60, the procedure determines if the correct portion size is displayed. If NO, at block 64 a pull-down is displayed to enable the user to make a portion size selection. If the correct portion size is displayed at block 60, processing continues to block 70 where the user indicates completion of the download portion size selection process. At block 72, the procedure determines if the user desires to specify a target platform for the download file. If YES, at block 82 the procedure displays a pull-down to specify the target platform and processing continues at block 74. If the user does not wish to specify a target platform at block 72, processing continues at block 74 where the user selects the appropriate button to initiate the download operation. At block 76, the procedure presents the user with dynamically generated screens similar to the one shown in FIG. 3, and generates the links to download the file. Processing continues at block 78 where the user selects the links (Buttons) to each of the downloaded portions as shown in FIG. 3. At block 80, a check is performed to determine if all the portions have been downloaded. If NO, processing returns to block 78. If all the portions have been downloaded, processing continues at block 84 to select the link (Button) to the combine shell script file, which is executed to assemble the downloaded portions into a single file on the client machine. At block 86, the "combine" shell script file, or executable, is executed to combine the downloaded portions into a single file on the client machine, and the procedure ends at block 88. One skilled in the art will recognize that the "combine" executable may or may not contain logic which selectively deletes the temporary portions after or during the process of creating the combined file.

Figure 6:
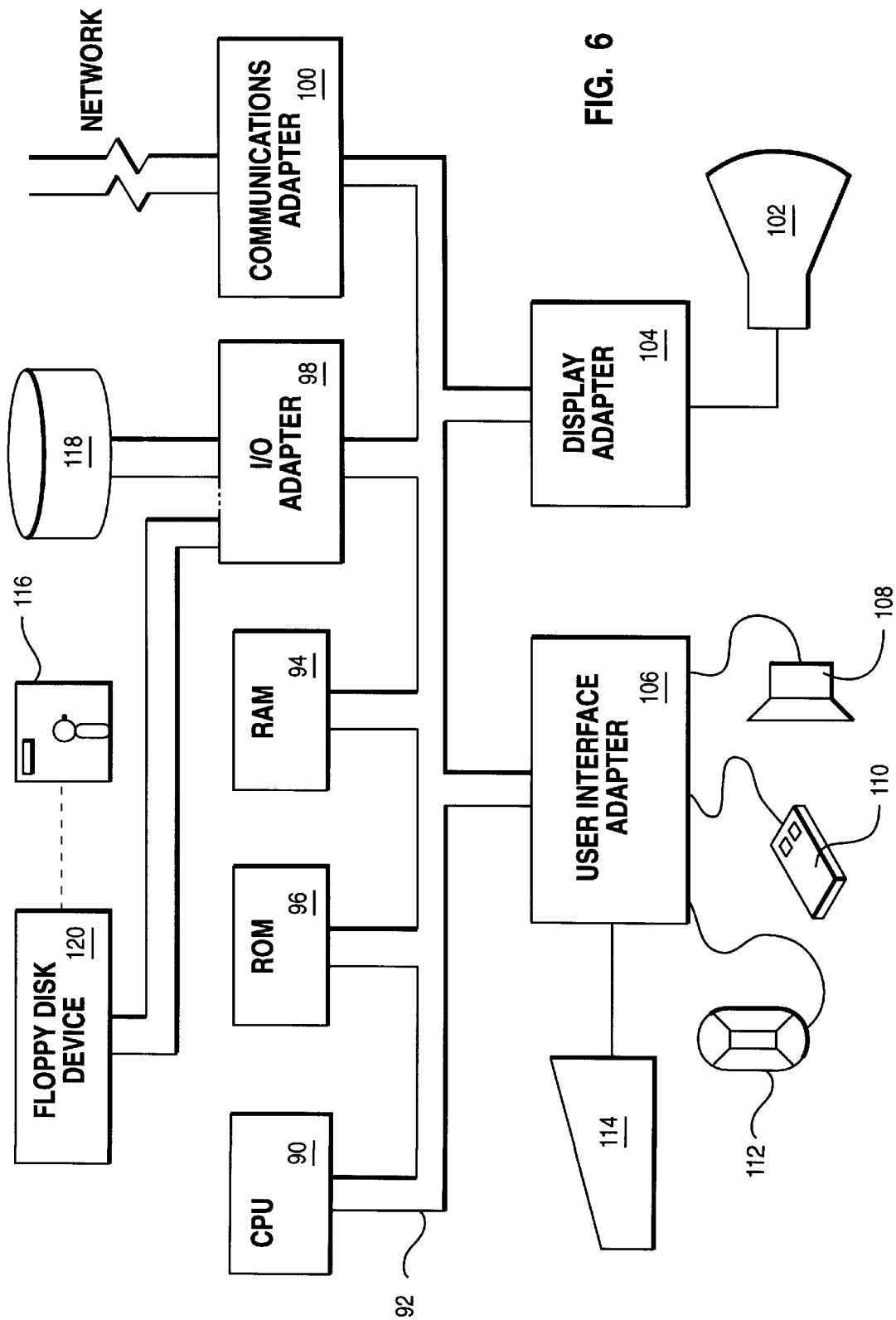
FIG. 6 is an illustrative embodiment of a computer workstation where the present invention may be practiced.

Referring now to FIG. 6, there is shown a pictorial representation of a workstation which may be used as a client or server machine, having a central processing unit 90, such as a conventional microprocessor, and a number of other units interconnected via a system bus 92. The workstation shown in FIG. 6, includes a Random Access Memory (RAM) 94, Read Only Memory (ROM) 96, an I/O adapter 98 for connecting peripheral devices such as floppy disk unit 120 to the bus, a user interface adapter 106 for connecting a keyboard 114, a mouse 110, a speaker 108, a microphone 112, and/or other user interface devices such as a touch screen device (not shown) to the bus, a communication adapter 100, for connecting the workstation to a data processing network and a display adapter 104, for connecting the bus to a display device 102. The workstation, in the preferred embodiment, has resident thereon server or client software making up this invention which may be loaded from diskette 116.

Figure 7:
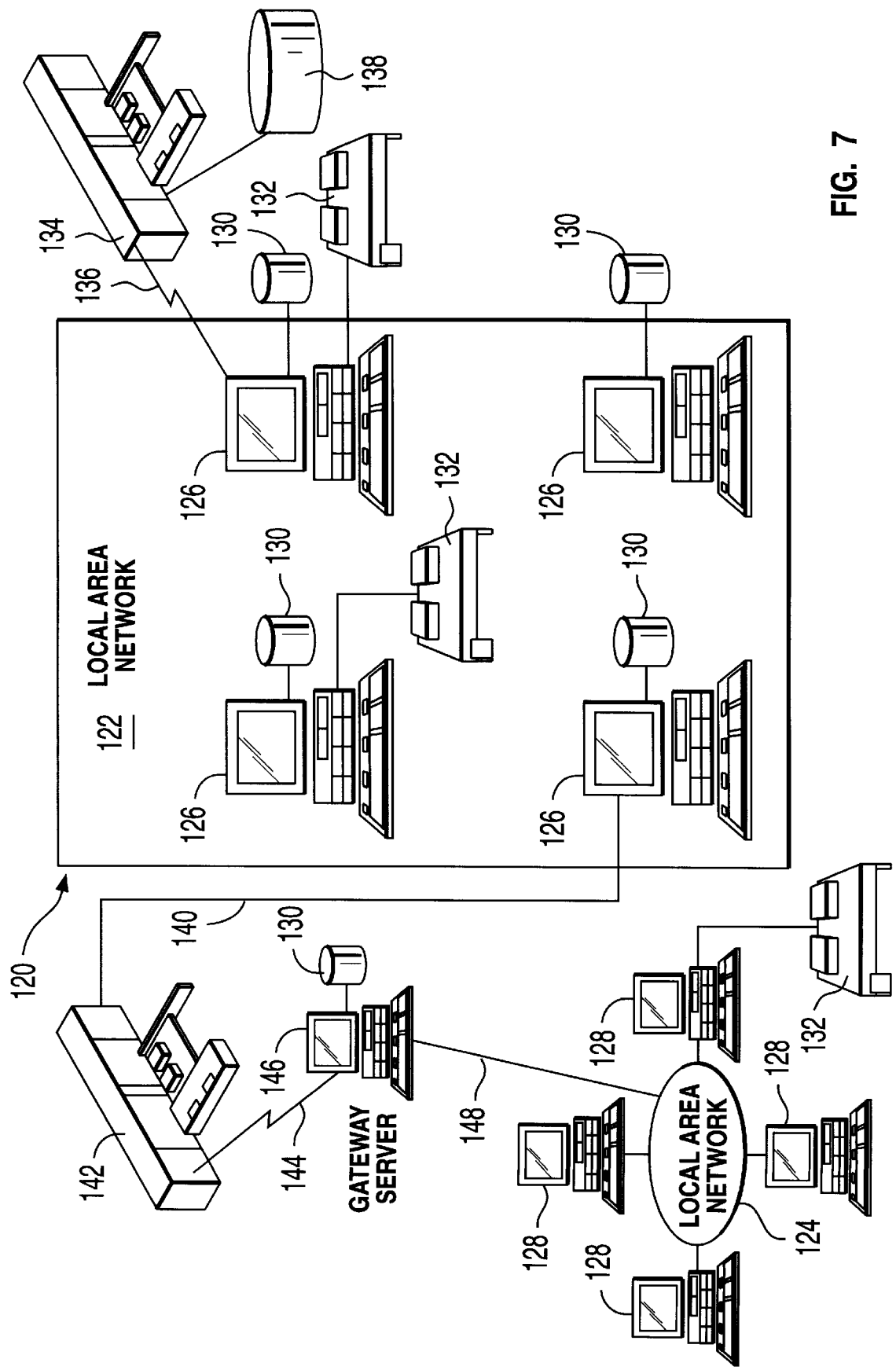
FIG. 7 is an illustrative embodiment of a heterogeneous distributed data processing system in accordance with the present invention.

A representative network environment where this invention may be practiced is depicted in FIG. 7, which illustrates a pictorial representation of a distributed data processing system 120. As illustrated, data processing system 120 contains a plurality of networks, including local area networks (LAN) 122 and 124, each of which preferably includes a plurality of individual computers 126 and 128, respectively as shown in FIG. 6. One skilled in the art will appreciate that a plurality of workstations coupled to a host processor may be utilized for each such network. As is common in such data processing systems, each computer 126 and 128, may be coupled to a storage device 130, and a printer 132.

Data processing system 120 further includes one or more mainframe computers, such as mainframe computer 134, which may be preferably coupled to LAN 122 by means of a communication link 136. Mainframe computer 134 is preferably coupled to a storage device 138, which serves as remote storage for LAN 122. LAN 122 is also coupled via communications link 140 through communications controller 142 and communications link 144 to gateway server 146. Gateway server 146 is preferably a workstation which serves to link LAN 124 to LAN 122 via communications link 148. As understood by one skilled in the art, data processing system 120 additionally includes unillustrated gateways, routers, bridges, and various other network hardware utilized to interconnect the segments of data processing system 120.

While the invention has been described with respect to a preferred embodiment thereof, it will be understood by those skilled in the art that various changes in detail may be made therein without departing from the spirit, scope, and teaching of the invention. Accordingly, the herein disclosed invention is to be limited only as specified in the following claims.

What we claim is:

1. A method, implemented in a computer system, for passing a file from a server machine to a client machine, comprising the steps of:

providing a plurality of large files on said server machine for downloading to said client machine, said server machine capable of downloading one of said plurality of large files in a single continuous operation;

selecting one of said plurality of large files by a user on said client machine for downloading to said client machine;

selecting a size for portions of said selected one of said plurality of large files by said user to download to said client machine from said server machine; and downloading said selected one of said large files from said server machine to said client machine using said size of the portions selected by said user.

2. The method of claim 1 wherein the step of downloading said selected one of said large files further comprises:

assembling the portions of said large file downloaded to said client machine into a single file on said client machine.

3. The method of claim 1 wherein the step of selecting a size for portions further comprises:

displaying a plurality of sizes for portions of said selected file to said user at said client machine; and selecting one of said plurality of sizes by said user for portions of said selected file based on the performance capability of said client machine.

4. The method of claim 3, wherein the step of displaying a plurality of sizes further comprises:

dynamically generating a screen containing user selections and displaying said screen to said user at said client machine.

5. An apparatus for passing a file from a server machine to a client machine, comprising:

means for providing a plurality of large files on said server machine for downloading to said client machine, said server machine capable of downloading one of said plurality of large files in a single continuous operation;

means for selecting one of said plurality of large files by a user on said client machine for downloading to said client machine;

means for selecting a size for portions of said selected one of said plurality of large files by said user to download to said client machine from said server machine; and means for downloading said selected one of said large files from said server machine to said client machine using said size of the portions selected by said user.

6. The apparatus of claim 5 wherein said means for downloading said selected one of said large files further comprises:

means for assembling the portions of said large file downloaded to said client machine into a single file on said client machine.

7. The apparatus of claim 5, wherein the means for selecting a size for portions further comprises:

means for displaying a plurality of sizes for portions of said selected file to said user at said client machine; and means for selecting one of said plurality of sizes by said user for portions of said selected file based on the performance capability of said client machine.

8. The apparatus of claim 5 wherein said means for displaying a plurality of sizes further comprises:

means for dynamically generating a screen containing user selections and displaying said screen to said user at said client machine.

9. A computer program product having a computer readable medium having computer program logic recorded thereon for passing a file from a server machine to a client machine, comprising:

computer readable means for providing a plurality of large files on said server machine for downloading to said client machine, said server capable of downloading one of said plurality of large files in a single continuous operation;

computer readable means for selecting one of said plurality of large files by a user on said client machine for downloading to said client machine;

computer readable means for selecting a size for portions of said selected one of said plurality of large files by said user to download to said client machine from said server machine; and computer readable means for downloading said selected one of said large files from said server machine to said client machine using said size of the portions selected by said user.

10. A computer program product of claim 9 wherein said computer readable means for downloading said selected one of said large files further comprises:

computer readable means for assembling the portions of said large file downloaded to said client machine into a single file on said client machine.

11. A computer program product of claim 10, wherein said computer readable means for selecting a size for portions further comprises:

computer readable means for displaying a plurality of sizes for portions of said selected file to said user at said client machine; and computer readable means for selecting one of said plurality of sizes by said user for portions of said selected file based on the performance capability of said client machine.

12. A computer program product of claim 11 wherein said computer readable means for displaying a plurality of sizes further comprises:

computer readable means for dynamically generating a screen containing user selections and displaying said screen to said user at said client machine.

* * * * *